(12) United States Patent
Morris

(10) Patent No.: US 7,970,250 B2
(45) Date of Patent: Jun. 28, 2011

(54) METHOD OF REMOVING A TELECOMMUNICATIONS PANEL FROM A FRAME

(75) Inventor: Stephen James Morris, Cheltenham (GB)

(73) Assignee: ADC GmbH (DE)

( * ) Notice: Subject to any disclaimer, the term of this patent is extended or adjusted under 35 U.S.C. 154(b) by 0 days.

(21) Appl. No.: 12/655,432

(22) Filed: Dec. 29, 2009

(65) Prior Publication Data

US 2010/0107395 A1     May 6, 2010

Related U.S. Application Data

(62) Division of application No. 11/821,542, filed on Jun. 22, 2007, now Pat. No. 7,660,507.

(60) Provisional application No. 60/816,004, filed on Jun. 23, 2006.

(51) Int. Cl.
*G02B 6/00* (2006.01)
*H05K 5/00* (2006.01)
(52) U.S. Cl. ......... 385/135; 385/136; 361/724; 361/730
(58) Field of Classification Search .......... 385/134–137; 361/724, 730
See application file for complete search history.

(56) References Cited

U.S. PATENT DOCUMENTS

| | | | |
|---|---|---|---|
| 6,266,248 B1 * | 7/2001 | Hanas et al. | 361/752 |
| 6,272,005 B1 | 8/2001 | Jensen et al. | |
| 6,504,988 B1 | 1/2003 | Trebesch et al. | |
| 6,646,883 B2 | 11/2003 | Salinas | |
| 7,023,704 B1 * | 4/2006 | Zarnowitz et al. | 361/798 |
| 7,171,099 B2 | 1/2007 | Barnes et al. | |
| 7,292,456 B2 * | 11/2007 | Leung et al. | 361/798 |
| 7,308,184 B2 | 12/2007 | Barnes et al. | |
| 7,455,539 B2 * | 11/2008 | Gunther et al. | 439/160 |
| 7,499,623 B2 | 3/2009 | Barnes et al. | |
| 7,660,507 B2 | 2/2010 | Morris | |

FOREIGN PATENT DOCUMENTS

| | | |
|---|---|---|
| DE | 103 13 358 B3 | 8/2004 |
| GB | 2 339 090 A | 1/2000 |
| GB | 2 420 665 A | 5/2006 |
| WO | WO 2008/045994 A2 | 4/2008 |

OTHER PUBLICATIONS

Morris, U.S. Appl. No. 11/821,543, filed Jun. 22, 2007 *Mounting System for Telecommunications Panels*.

* cited by examiner

*Primary Examiner* — Daniel Petkovsek
(74) *Attorney, Agent, or Firm* — Merchant & Gould P.C.

(57) ABSTRACT

A latch and handle arrangement for a panel that provides a number of functions. The arrangement including a lever arm that functions as both a handle and a latch release in some panel and frame embodiments. The lever arm also functioning as a fastener cover in other panel and frame embodiments.

7 Claims, 5 Drawing Sheets

METHOD OF REMOVING A TELECOMMUNICATIONS PANEL FROM A FRAME

CROSS REFERENCE TO RELATED APPLICATIONS

This application is a divisional of application Ser. No. 11/821,542, filed Jun. 22, 2007, now U.S. Pat. No. 7,660,507; which claims the benefit of U.S. Provisional Application No. 60/816,004, filed Jun. 23, 2006; which applications are incorporated herein by reference.

TECHNICAL FIELD

The present disclosure relates generally to devices for use in the telecommunications industry, and various methods associated with such devices. More particularly, this disclosure relates to latch and handle arrangements for telecommunication panels.

BACKGROUND

Telecommunication panels are used to provide electrical connections in a wide variety of telecommunication applications. The panels are often housed within and mounted to racks and cabinets, for example. Many racks and cabinets include frames having defined positions at which panels may be mounted. The panels are typically secured to the frame by standard mechanical fasteners, such as screws. The panels are assembled and disassembled from the rack using conventional tools, such as a screwdriver. The fasteners or screws of the panel are completely visible and accessible.

Such known panels sometimes have latches for locking the panel in a stationary position when mounted at a location on the frame. These panels also may have separate handles for pulling or removing the panel from the frame.

In general, improvement has been sought with respect to telecommunications panel arrangements and methods.

SUMMARY

The present disclosure relates to a combined latch and handle arrangement for a telecommunications panel. A variety of examples of desirable product features or methods are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are explanatory only, and are not restrictive of the claimed invention.

DETAILED DESCRIPTION

Reference will now be made in detail to various features of the present disclosure that are illustrated in the accompanying drawings. Wherever possible, the same reference numbers will be used throughout the drawings to refer to the same or like parts.

Figure 1:
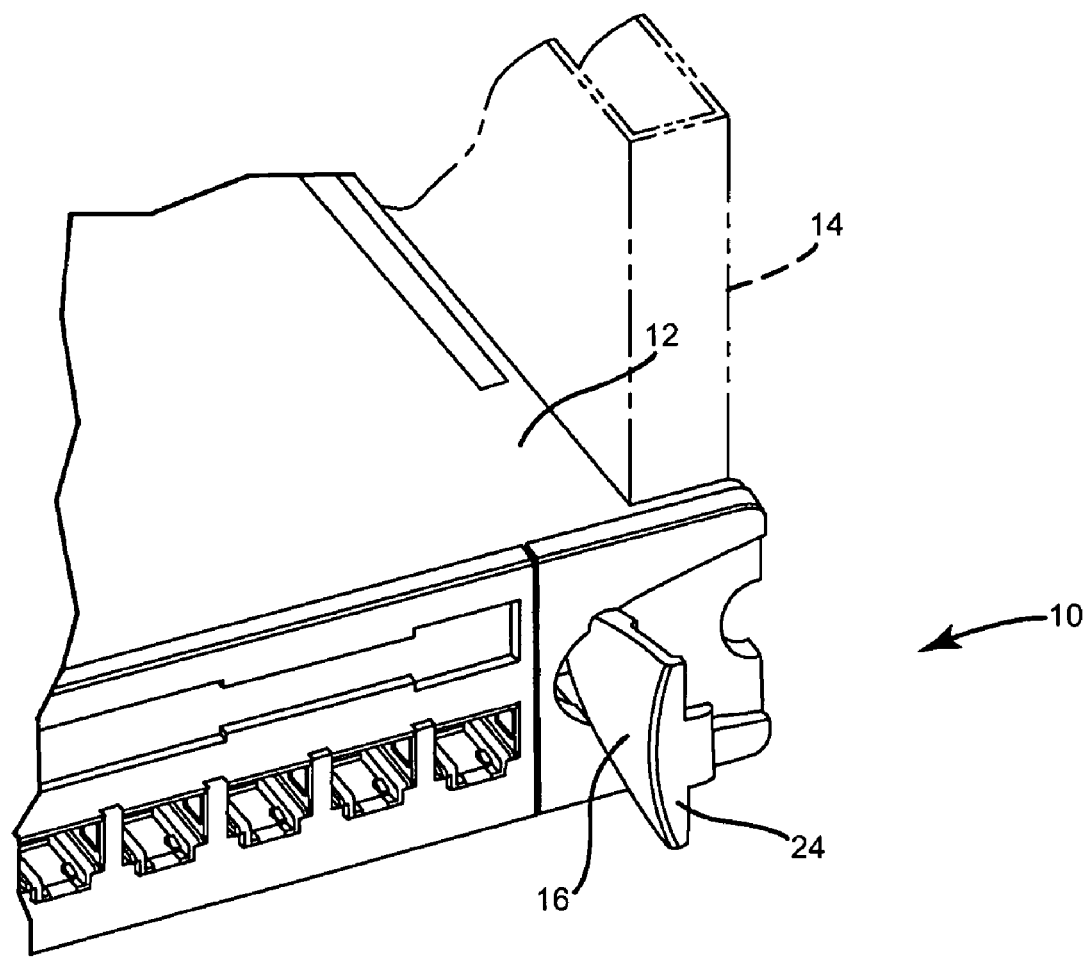
FIG. 1 is a partial perspective view of a telecommunications panel illustrating one embodiment of a latch and handle arrangement, according to the principles of the present disclosure.
Figure 2:
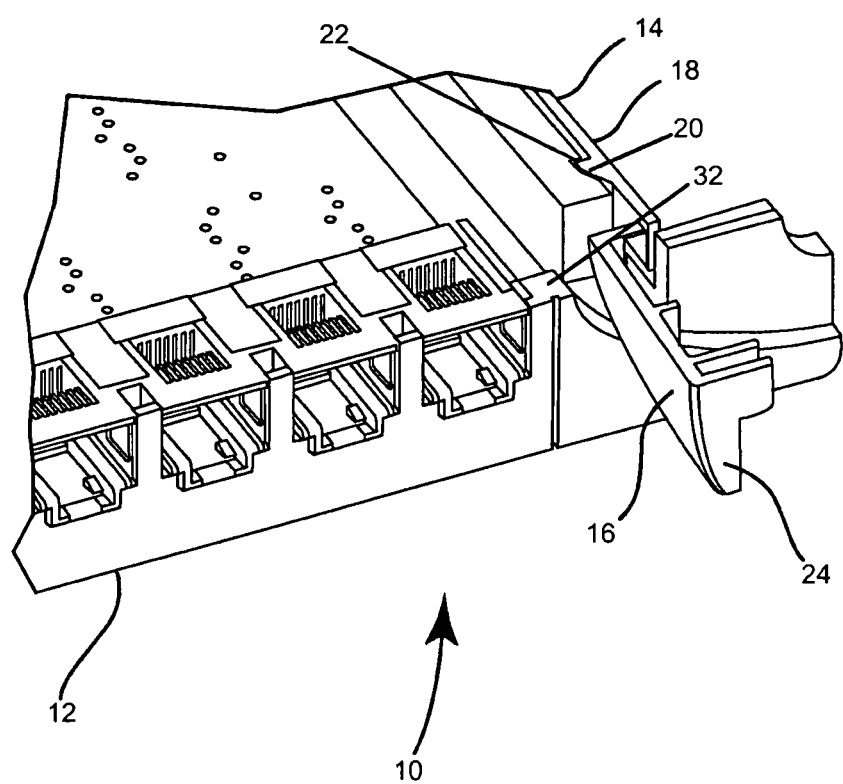
FIG. 2 is a cross-sectional, perspective view of the latch and handle arrangement of the telecommunications panel of FIG. 1.

FIGS. 1 and 2 illustrate one embodiment of a telecommunications panel 12 including a latch and handle arrangement 10 in accordance with the principles disclosed. In use, the telecommunications panel 12 is typically mounted to a frame 14 (partially and schematically represented in FIG. 1), such as a telecommunications rack frame, for example. The panel 12 and latch and handle arrangement 10 can also be utilized in other systems and structures, such as cabinets and wall boxes, for example. The panel 12 in the illustrated embodiment is a patch panel, however, other types of panels and equipment can be provided with the present latch and handle arrangement in accordance with the principles disclosed.

In conventional panel arrangements, the latch release mechanism and the handle are provided as separate components. In the illustrated embodiment, the present arrangement 10 combines the functions and features of a latch release and a handle into a single mechanism or component. In yet another embodiment, the present arrangement 10 functions as a latch release and a handle, and further as a fastener cover.

Figure 3:
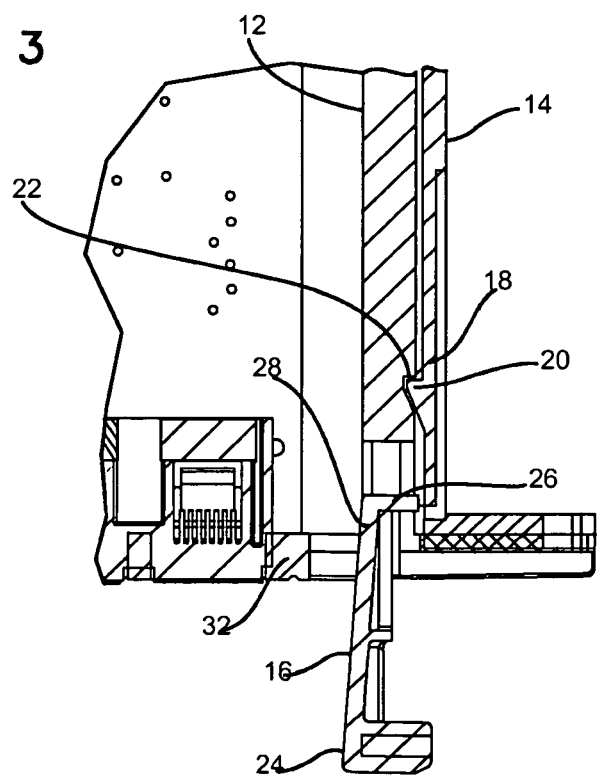
FIG. 3 is a cross-sectional, top plan view of the latch and handle arrangement of FIG. 2.
Figure 4:
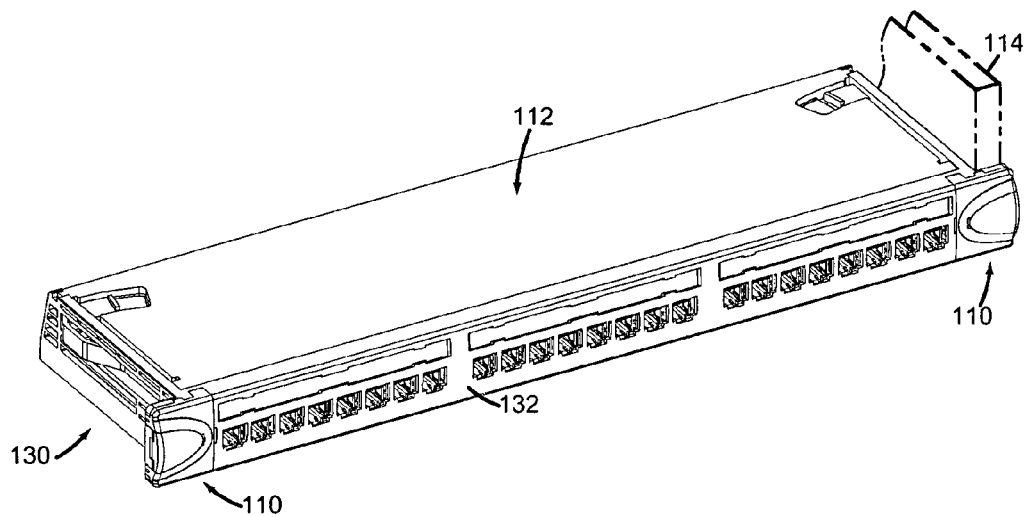
FIG. 4 is a front perspective view of another telecommunications panel illustrating another embodiment of a latch and handle arrangement, according to the principles of the present disclosure.
Figure 5:
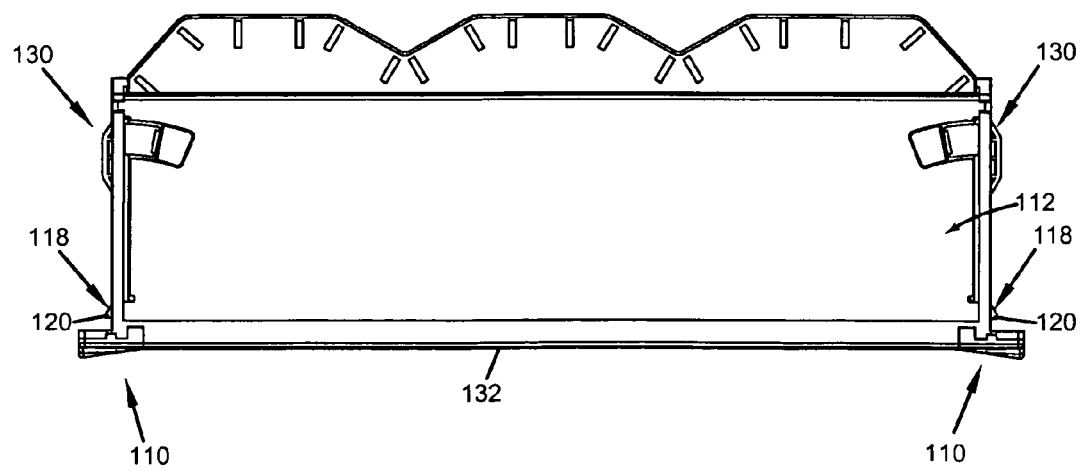
FIG. 5 is a top plan view of the telecommunications panel of FIG. 4.
Figure 6:
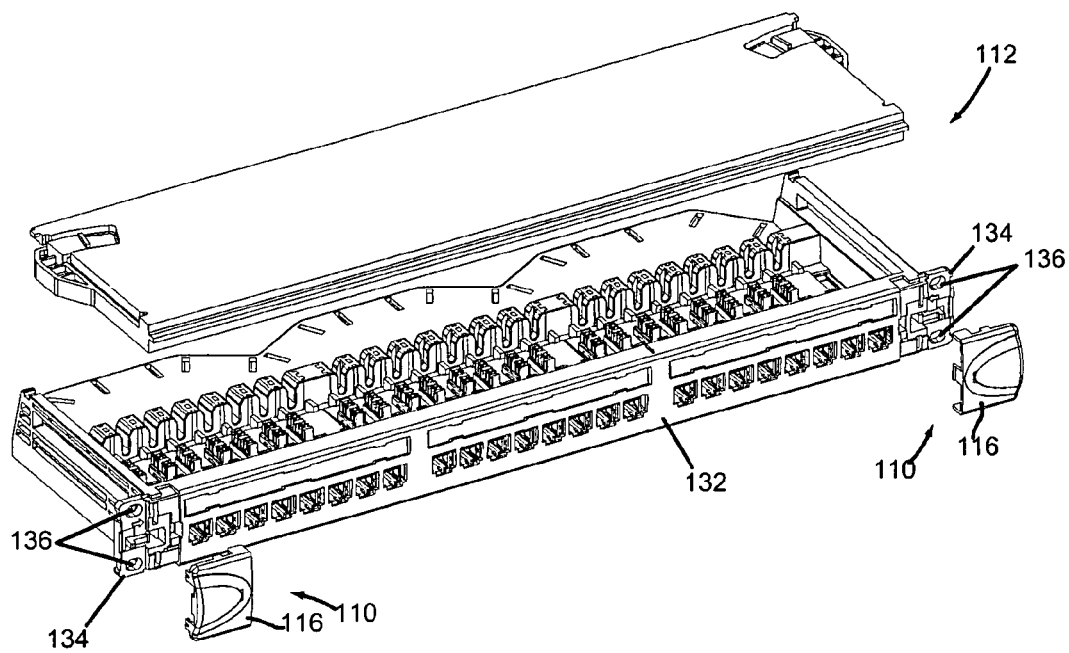
FIG. 6 is an exploded perspective view of the telecommunications panel of FIG. 4.
Figure 7:
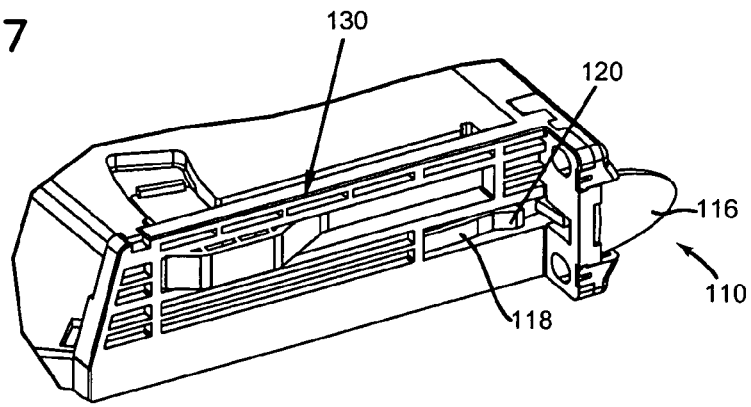
FIG. 7 is a partial, side perspective view of the latch and handle arrangement of the telecommunications panel of FIG. 4.
Figure 8:
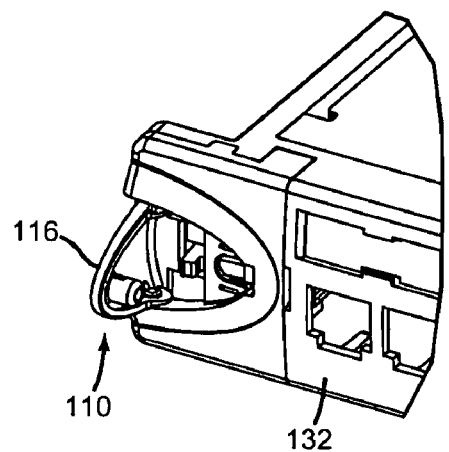
FIG. 8 is a partial, front perspective view of the latch and handle arrangement of FIG. 7.

The latch and handle arrangement 10 of FIGS. 1-3 is provided on a panel 12 having a snap-fit mounting arrangement (not shown); although the arrangement 10 can also be provided on panels with standard fastener mounting arrangements. The snap-fit mounting arrangement of the panel illustrated in FIGS. 1-3 is configured to mount to the panel to a frame without the use of fasteners. Further details of such a mounting arrangement are provided in U.S. application Ser. No. 11/821,543; which application is incorporated herein by reference.

The panel 12 is mounted to the frame 14 by simply sliding the panel 12 into a panel-mounting location defined by the frame. In the illustrated embodiment, the frame 14 includes a flexible latch 18 (FIG. 2) that locks the panel 12 in position relative to the frame 14. During installation of the panel 12, the latch 18 deflects outward, but then returns to the position shown in FIG. 2 when the panel is fully inserted or installed within the frame 14. The latch 18 includes a catch 20 that engages a corresponding aperture 22 (e.g., notch or slot) formed in the panel 12 to lock the panel in position relative to the frame 14.

The latch and handle arrangement 10 of the present disclosure is used to remove the panel 12 from the frame 14. The arrangement 10 generally includes a lever arm or handle 16 provided on a front face 32 of the panel 12. Pulling and rotating the lever arm 16 disengages the latch 18 of the frame 14 from the panel 12. The lever arm 16 further functions as a handle so that the panel 12 can be both released and pulled out from the frame 14 in one movement.

In particular, to remove the panel 12 from the frame 14, the lever arm 16 is rotated from a first (closed) position to a second releasing position (the second releasing position shown in FIGS. 1-3). Referring to FIG. 3, as a first end 24 of the lever arm 16 pivots to the second releasing position, a disengagement tab 26 located at a second end 28 of the lever arm contacts the latch 18 of the frame 14. The disengagement tab 26 biases or deflects the latch 18 away from the panel 12 such that the catch 20 disengages from the notch 22 of the panel 12. When the latch 18 has been released or disengaged, the lever arm 16 is ideally positioned to function as a handle for removing the panel. In particular, with the frame latch 18 disengaged, the lever arm 16 extends outward from the front face 32 of the panel 12. The outward extending lever arm 16 can then be pulled upon to remove the panel 12 from the frame 14. While FIGS. 1-3 show only one latch and handle arrangement 10, as can be understood, the panel 12 typically includes two latch and handle arrangements located at opposite sides of the panel 12.

In the above application, the latch and handle arrangement 10 functions as both a latch release element and as a handle to remove the panel 12 from the frame 14. In another application, however, the present arrangement 10 can be used with panels having standard fastener mounting arrangements, and whereby the arrangement functions as a latch release element and a handle, as well as a fastener cover.

For example, latch and handle arrangement 10 can be provided on panels having standard fastener mounting brackets that utilize mounting screws to fasten the panel to the frame. The mounting screws are typically visible and accessible from the front of such panels. With the present latch and handle arrangement, the screws can be covered by the lever arm 16 when the lever arm is in a closed position. Covering the fasteners or screws of a fastener mounted panel provides advantages in that the screws of the panel and frame system are no longer visible; the system thereby being more aesthetically pleasing. In addition, covering the screws can deter unwanted access to the internal region of the panels. That is, the lever arm 16 acts as a low level security feature by hiding the screws from plain sight. The lever arm 16 can further include detent bumps or similar structure to secure or lock the lever arm 16 in the closed position, if desired.

Referring now to FIGS. 4-9, another embodiment of a latch and handle arrangement 110 is illustrated. The arrangement 110 is shown on a panel 112 having a snap-fit mounting arrangement 130 that snap-fits the panel 112 to a telecommunications frame 114; although the arrangement 110 can also be used on panels having standard fastener mounting arrangements. The snap-fit mounting arrangement 130 of the panel 112 shown in FIGS. 4-9 is configured to mount the panel 112 to the frame 114 without the use of fasteners. Further details of such a mounting arrangement are provided in U.S. application Ser. No. 11/821,543; which application is previously incorporated herein by reference.

The panel 112 is mounted to the frame 114 by simply sliding the panel 112 into a panel mounting location defined by the frame. In the illustrated embodiment, the panel 112 includes a flexible latch 118 (FIG. 7) that locks the panel 112 in a position relative to the frame 114. While installing the panel 112 into the frame, the latch 118 deflects, but then returns to the position shown in FIG. 5 when the panel is fully inserted or installed within the frame. The latch 118 includes a catch 120 (FIG. 9) that engages a corresponding aperture 122 (e.g., notch or slot) formed in the frame 114 to lock the panel 112 in position relative to the frame.

Similar to the previous embodiment, the latch and handle arrangement 110 is used to remove the panel 112 from the frame 114. The arrangement 110 generally includes a lever arm or handle 116 (FIGS. 6 and 7) provided on a front face 132 of the panel 112. Pulling and rotating the lever arm 116 disengages the latch 118 of the panel 112 from the frame. The lever arm 116 further functions as a handle so that the panel 112 can be both released and pulled out from the frame in one movement.

Figure 9:
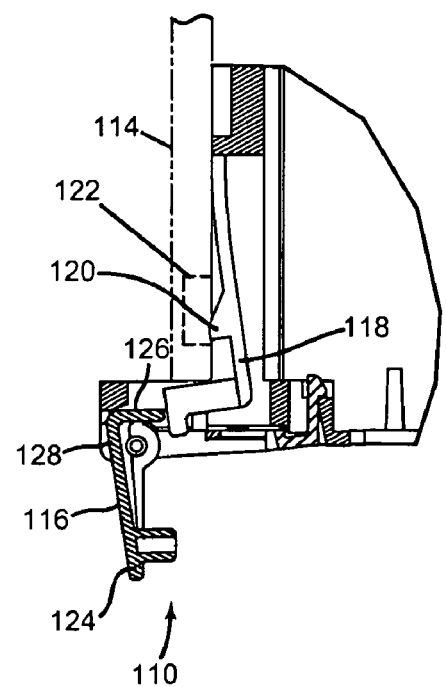
FIG. 9 is a partial, cross-sectional, top plan view of the latch and handle arrangement of FIG. 8.

In particular, and referring to FIG. 9, as a first end 124 of the lever arm or handle 116 is pivoted from a first (closed) position (shown in FIG. 4) to a second releasing position (shown in FIGS. 8 and 9), a disengagement tab 126 located at a second end 128 of the lever arm contacts the latch 118 of the panel 112. The disengagement tab 126 biases or deflects the latch 118 away from the frame 114 such that the catch 120 disengages from the notch 122 of the frame. When the latch 118 has been released or disengaged, the lever arm 116 is ideally positioned to function as a handle for removing the panel. In particular, with the panel latch 118 disengaged, the lever arm 112 extends outward from the front face 132 of panel 112 so that the panel can be pulled out and removed from the frame. The latch and handle arrangement 110 accordingly functions as both a latch release element and as a handle. As shown, the panel 112 typically includes two latch and handle arrangements 110 located adjacent to opposite sides of the panel 112.

Similar to the previous embodiment, the present arrangement 110 can be used with panels having standard fastener mounting arrangements, so that the arrangement functions not only as a latch release element and a handle, but also as a fastener cover.

For example, referring back to FIG. 6, the panel 112 can include mounting brackets 134 having fastener holes 136. The provision of such brackets 134 allows the panel 112 to be used on conventional frames having only fastener-mounting capability. Mounting screws that fasten panels to convention frames are typically visible and accessible from the front of the panel. With the present latch and handle arrangement, the screws (and/or fastener holes, e.g., 136) are covered by the lever arm 116 when the lever arm is in the first closed position (see FIG. 4). Covering the fasteners or screws of a fastener mounted panel provides advantages in that the screws of the panel and frame system are no longer visible; the system thereby being more aesthetically pleasing. In addition, covering the screws can deter unwanted access to the internal region of the panels. That is, the lever arm 116 acts as a low level security feature by hiding the screws, and can include detent bumps or similar structure to secure or lock the lever arm 116 in the closed position, if desired.

The above specification provides a complete description of the present invention. Since many embodiments of the invention can be made without departing from the spirit and scope of the invention, certain aspects of the invention reside in the claims hereinafter appended.

What is claimed is:

1. A method of removing a telecommunications panel from a telecommunications frame, the method comprising the steps of:
   a) providing a telecommunications panel releasably locked in position relative to a telecommunications frame;
   b) rotating a handle provided on the panel, the rotating handle simultaneously contacting a flexible latch provided on one of the panel and the frame, wherein contacting the flexible latch releases the latch from a notch formed in the other of the panel and the frame, and wherein releasing the latch from the notch unlocks the telecommunications panel from the telecommunications frame; and c) pulling on the handle to remove the unlocked telecommunications panel from the telecommunications frame.

2. The method of claim 1, wherein the latch is provided on the telecommunications frame, and wherein releasing the latch includes biasing the latch such that a catch of the latch disengages from the notch formed in the telecommunications panel.

3. The method of claim 2, wherein a tab extension provided on the handle biases the latch in an outward direction as the handle rotates to disengage the catch of the latch from the notch.

4. The method of claim 1, wherein the latch is provided on the telecommunications panel, and wherein releasing the latch includes biasing the latch such that a catch of the latch disengages from the notch formed in the telecommunications frame.

5. The method of claim 4, wherein a tab extension provided on the handle biases the latch in an inward direction as the handle rotates to disengage the catch of the latch from the notch.

6. The method of claim 1, wherein the handle is located on a face plate of the telecommunications panel.

7. The method of claim 1, including rotating two handles provided on opposite sides of the panel, wherein rotating the two handles releases two latches to unlock the panel from the frame.

* * * * *